United States Patent [19]
Werth, Jr.

[11] Patent Number: 4,515,414
[45] Date of Patent: May 7, 1985

[54] AUTOMATIC ADJUSTING GIB ASSEMBLY

[75] Inventor: Carl H. Werth, Jr., Bridgeport, Mich.

[73] Assignee: Werth Engineering, Inc., Bridgeport, Mich.

[21] Appl. No.: 544,208

[22] Filed: Oct. 21, 1983

[51] Int. Cl.³ .............................................. F16C 29/12
[52] U.S. Cl. ...................................................... 308/3 R
[58] Field of Search ............... 308/3 R, 3 A, 3.5, 5 R, 308/6 R

[56] References Cited

U.S. PATENT DOCUMENTS

| | | |
|---|---|---|
| 2,163,604 | 6/1939 | Johnson . |
| 2,738,625 | 3/1956 | Strnad . |
| 2,914,362 | 11/1959 | Ott et al. ............................ 308/3 A |
| 3,030,155 | 4/1962 | Bullard ................................... 308/3 |
| 3,113,807 | 12/1963 | Polidor ................................... 308/6 |
| 3,326,032 | 1/1967 | Stuhldreher ........................... 72/463 |
| 3,700,292 | 10/1972 | Owens ................................. 308/3 A |
| 3,953,086 | 4/1976 | Chaffin ................................ 308/3 A |
| 4,068,906 | 1/1978 | Dür et al. ............................ 308/3 A |
| 4,161,342 | 7/1979 | Nelsen ................................. 308/3 A |

Primary Examiner—Lenard A. Footland
Attorney, Agent, or Firm—Learman & McCulloch

[57] ABSTRACT

An automatically compensating gib assembly includes spring loaded pins resiliently biased outwardly from longitudinal bores at each end of a movable gib element. End caps fixedly mounted at each end of a mating fixed gib element are provided with enlarged conical bores which present a downwardly inclined surface against which the spring loaded pins is urged to thus resiliently bias the movable gib downwardly relative to the fixed gib to automatically compensate for side loading variations in a slide assembly.

6 Claims, 5 Drawing Figures

U.S. Patent  May 7, 1985  4,515,414
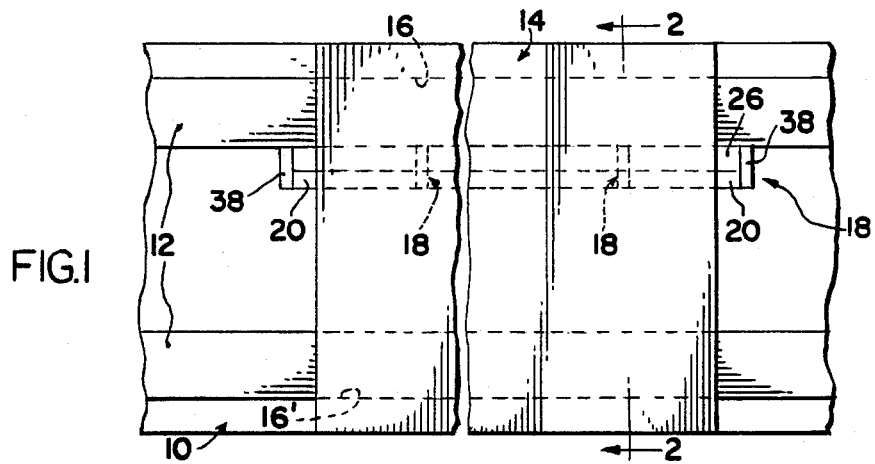
FIG. 1
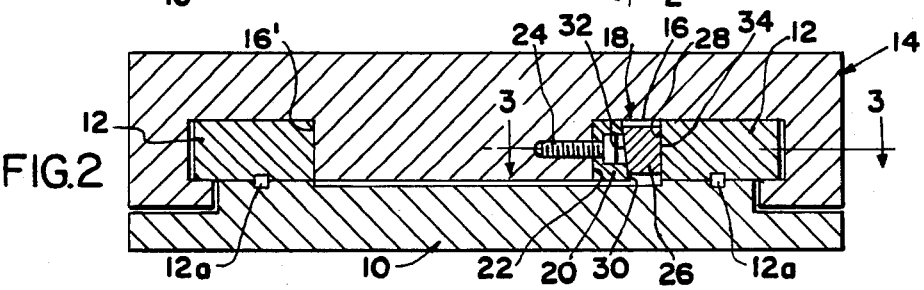
FIG. 2
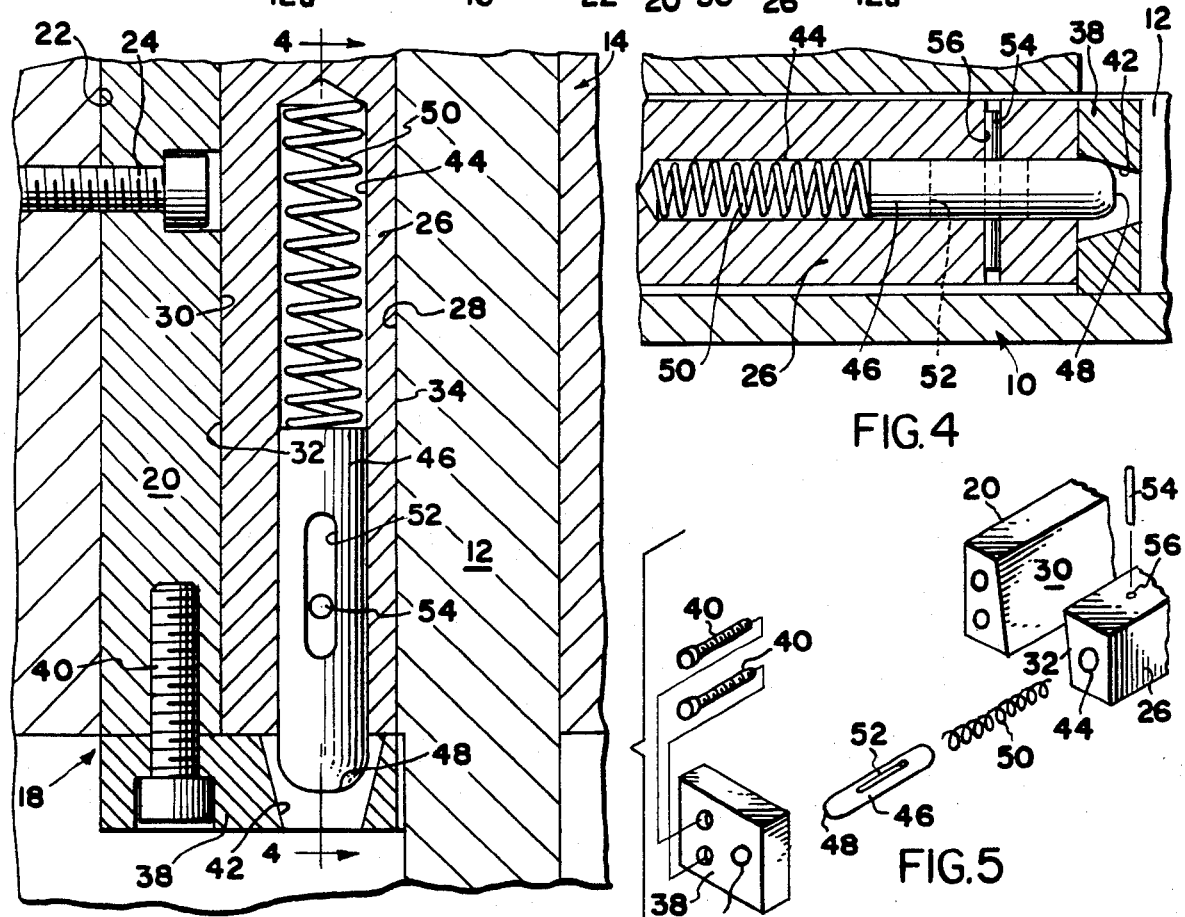
FIG. 3
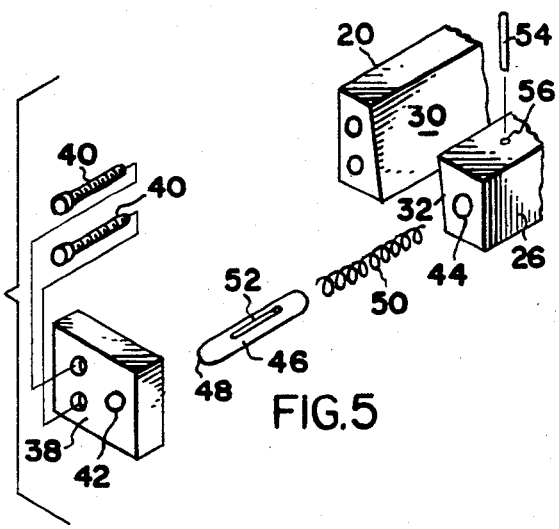
FIG. 4
FIG. 5

AUTOMATIC ADJUSTING GIB ASSEMBLY

BACKGROUND OF THE INVENTION

The present invention is directed to gib assemblies of the type used typically in machine tool slide assemblies to maintain a slide surface in face-to-face contact with a guide rail surface by removing all clearance or looseness between the two sliding parts. In a typical gib installation, a guide slot is formed with a width greater than the width of a guide rail which is received within the slot. A pair of gib members are located between one side wall of the slot and the facing side wall of the guide rail. The two gib members are in face-to-face engagement with each other along a surface which is inclined to the side walls so that vertical movement of one gib element relative to the other exerts a wedging action which effectively narrows the width of the slot to produce a zero transverse clearance between the side walls of the slot, gib, and guide rail.

From the foregoing description, it is apparent that in order to take up or eliminate the clearance between the guide rail and the slot, adjustment of the position of one gib element relative to the other is required. This adjustment must be made in a manner such that all clearance is removed, but, at the same time, care must be taken that the adjustment is not made so tight as to interfere with free sliding movement between the rail and slot side wall. Typically, this adjustment involves a screw type adjustment of some sort, and typically the manual adjustment, once made, holds the two gib elements in fixed positions relative to each other. The initial setting is normally made with the parts stationary, a procedure which assumes the width of the slot and guide rail to be precisely uniform throughout their length as well as being precisely straight and parallel, conditions which do not always exist when the machine is operated under load.

The present invention is especially directed to a gib assembly which may be preset to establish a predetermined force of engagement between opposed sliding surfaces of a guide rail and slot and which is capable of automatically adjusting itself to compensate for variable conditions encountered during operation such as vibration, deflection under load, wear, etc.

SUMMARY OF THE INVENTION

A gib assembly according to the present invention takes the form of relatively movable gib elements of conventional shape having parallel vertical outer longitudinal side walls and engaged with each other in sliding face-to-face relationship at two complementarily inclined inner longitudinal side surfaces. One of the gib elements is adapted to be fixedly mounted to the side wall of a sliding element with its inclined side surface sloping downwardly and outwardly from the side wall upon which it is mounted. The height of the second or movable gib element is less than that of the fixed gib element so that the second gib element can move over a reasonable range vertically relative to the fixed gib element without interference from other surfaces which may be flush with the top and bottom of the fixed gib element.

The two gib elements may be of equal length and have flat end surfaces. An end cap is fixedly mounted at each end of the fixed gib element and projects horizontally from the fixed gib element transversely across the adjacent ends of the second or movable gib element. A longitudinal bore extends inwardly into each end of the movable gib element, and within this bore a pin is slidably received and biased outwardly of the bore by a compression spring engaged between the pin and the inner end of the bore. The outer end of the pin is smoothly rounded.

Each end cap has a conical bore whose large diameter end faces the gib element and is of a diameter substantially greater than the diameter of the bore in the gib element, and hence of the pin slidably received within the bore. When the gib elements are used in the horizontal mode depicted, the axis of the conical bore in the end cap is offset downwardly from that of the pin. The projecting end of the pin slidably engages the top portion of the conical bore and the outward biasing action exerted upon the pin by the preloaded compression spring thus forces the pin axially against the downwardly inclined upper portion of the conical bore to thus force the second gib element downwardly relative to the first to thus increase the combined horizontal width of the two gib elements to provide the wedging action required.

One of the prime objects of the invention is to eliminate the need of manually adjusting gibs for slide assemblies and the like, thereby eliminating the possibility of human error and incorrect adjustment which leaves the assembly too tight or too loose, and causes vibration and size variance.

Another object of the invention is to provide an assembly which will move with essentially zero clearance, and thus reduce cutting tool vibrations, because the assembly better absorbs vibration.

Still another object of the invention is to provide a compensating gib assembly which will not back up and loosen as a result of tool or working loads, inasmuch as the matching angles of the gib and base surfaces are such as to be self-locking in the sense the movable gib will not move to decrease the effective width of the gib assembly under load.

Still another object of the invention is to provide a gib assembly in which both ends can, and will, adjust independently to ensure essentially zero running clearance at both ends of the assembly, even though the stationary guide rails may be incorrectly ground and have some size variance.

Other objects and features of the invention will become apparent by reference to the following specification and to the drawings.

IN THE DRAWINGS

FIG. 1 is a top plan view of a slide assembly employing gib assemblies embodying the present invention;

FIG. 2 is an enlarged, cross-sectional view taken on the line 2—2 of FIG. 1;

FIG. 3 is a still further enlarged detail cross-sectional view taken on the line 3—3 of FIG. 2;

FIG. 4 is a detail cross-sectional view taken on the line 4—4 of FIG. 3; and

FIG. 5 is an exploded perspective view showing elements of the gib assembly.

Referring first to FIG. 1, there is shown in plan view an exemplary slide assembly of the type with which the present invention is employed. The slide may typically mount a tool or workpiece to be machined or otherwise treated. The slide assembly of FIG. 1 includes a stationary base designated generally 10 which may be a fixed portion of a machine tool base or frame, and upon which are fixedly mounted a pair of spaced, parallel guide rails designated generally 12 as with keys 12a. A slide 14 is slideably mounted upon base 10 and is formed with a pair of spaced parallel grooves or slots 16 and 16' which slideably receive fixed guide rails 12 to guide slide 14 in movement relative to base 10, the one slot 16 being enlarged in width relative to the other. Gib assemblies designated generally 18 are received within the enlarged the enlarged slot 16 at both its ends to eliminate clearance between the side walls of slot 16 and the adjacent guide rail 12.

The relationship between guide rails 12, slot 16 and gib assemblies 18 is more clearly shown in FIG. 2. In FIG. 2, it will be noted that the width of the slot 16 substantially exceeds the width of the associated guide rail 12. Gib assemblies 18 are employed, in effect, to fill up the space created by this difference in width between the slot and guide rail. Each gib assembly 18 includes a first or fixed gib element 20 which in the particular embodiment shown is fixedly mounted against one side wall 22 of slot 16 as by a series of countersunk machine screws 24. A second or movable gib element 26 is interposed between gib element 20 and the facing side wall 28 of the guide rail 12. Gib elements 20 and 26 are in slideable face-to-face engagement with each other at what will be identified as complementally inclined inner side walls or surfaces 30 and 32, respectively. The angle of these surfaces is self locking in the sense elements 26 under the tool thrust loads will not back up (i.e., 10° to the vertical).

From FIG. 2, it is believed apparent that if the two movable gib elements 26 (one at each end) are both forced downwardly, the engaged inclined surfaces 30, 32 exert a wedging action which, in the arrangement of FIG. 2, would attempt to force the two guide rails 12 horizontally away from each other. Because the guide rails 12 cannot move, their two opposed inner surfaces 28 are thus firmly maintained in flat face-to-face relationship with the respective opposed flat side surfaces 34 of the gib elements 26, thus removing all horizontal clearance which would accommodate any lateral movement of slide 14 relative to base 10.

The present invention is especially directed to structure for automatically adjusting the gib assembly to take up clearance in the manner described. This structure is best shown in FIGS. 3–5.

Referring to FIGS. 3–5, it is seen that an end cap 38 is fixedly mounted on the end of fixed gib element 20 as by machine screws 40. An end cap 38 is mounted at each end of gib element 20. End cap 38 projects horizontally from gib element 20 to overlie the adjacent end of gib element 26. A conical bore 42 extends through each end cap 38 with the large diameter end of bore 42 facing the end surface of gib element 26. A longitudinal bore 44 extends inwardly from the end of gib element 26 and slideably receives a pin 46 having a rounded outer end 48. A compression spring 50 is engaged between the inner end of bore 44 and the inner end of pin 46 to resiliently bias pin 46 outwardly from bore 44. To retain pin 46 within bore 44, an elongate longitudinally extending slot 52 is cut through the pin and a retainer pin 54 seated in a bore 56 slideably passes through slot 52.

As best seen in FIGS. 3 and 4, the large diameter end of conical bore 42 in end cap 38 is substantially larger than the diameter of the bore 44, and hence pin 46. The axis of conical bore 42, as best seen in FIG. 4, is located below the midpoint of the height of end cap 38. Thus, as best appreciated from FIG. 4, the rounded end 48 of pin 46 engages the upper portion only of bore 42. The action of springs 50 in biasing each pin 46 outwardly thus causes the rounded end of the pin to engage a downwardly inclined portion of the surface of the bore 42, and thus the outward biasing of the pin results in a downward biasing action on the movable gib element 26. The angularity of surfaces 42 and 48 is such (i.e., 15° off axis) that again self locking occurs in the sense the pins 46 will not back up under tool thrust loads.

The necessary characteristics of spring 50 which will achieve the desired amount of downward bias applied to movable gib 26 in the assembly can be calculated and achieved with a reasonable degree of precision. Because the magnitude of relative movement of the various parts necessary to compensate for variations encountered during normal operation of the slide assembly is very small, the biasing action exerted is essentially constant because extension or compression of spring 50 in the face of these variations is extremely minute.

It should be borne in mind, as indicated in FIG. 1, that the compensating adjustment, essentially a spring biased cam arrangement constituted by the preload pin 46 and conical bore 42 is employed at each end of each gib assembly, hence the gibs can each perform the necessary compensating action independently of each other. When short slides are involved, a single gib assembly can be employed and the opposite ends of the gibs perform the necessary compensating action in an independent manner.

While one embodiment of the invention has been described in detail, it will be apparent to those skilled in the art the disclosed embodiment may be modified. Therefore, the foregoing description is to be considered as exemplary rather than limiting and the true scope of the invention is that defined in the following claims.

What is claimed is:

1. In a device for a machine tool slide assembly or the like comprising a first member having an elongate guide rail with flat parallel longitudinal exterior side walls, a second member having an elongate guide rail receiving slot therein having flat parallel longitudinal interior side walls, the transverse width of said slot being greater than the transverse width of said rail to define a space between one pair of adjacent side walls of said rail and said slot when the other pair of adjacent side walls are in face-to-face engagement with each other, and an elongate gib disposed within said space and engaged between said one pair of adjacent side walls of said slot and rail, said gib comprising a first elongate gib element fixedly mounted on the side wall of one of said members and a second elongate gib element slideably engaged between said first gib element and the adjacent side wall of the other of said members, said gib elements engaging each other in face-to-face engagement along complementary flat longitudinal side surfaces inclined relative to said side walls whereby relative sliding movement of said gib elements transversely of said inclined side surfaces in one direction exerts a wedging action urging said one pair of adjacent side walls away from each other; the improvement comprising a cap fixedly secured to each end of said first gib element and projecting transversely from said first gib element across the corresponding end of said second gib element, and spring loaded cam means engaged between said second gib element and at least one of said caps resiliently biasing said second gib element in said first direction relative to said first gib element.

2. The invention defined in claim 1 wherein said cam means comprises a pin mounted in one of said second gib elements and said one of said caps for sliding movement longitudinally relative to said second gib element, means defining an inclined cam surface on the other of said second gib element and said one of said caps engaged with one end of said pin, and spring means biasing said pin against said inclined surface.

3. The invention defined in claim 2 further comprising means defining a bore extending longitudinally into said second gib element from one end thereof, said spring means comprising a compression spring seated on the inner end of said bore and said pin being slidably received within said bore and biased outwardly of said bore by said spring, and means defining a conical bore in the cap overlying said one end of said second gib element with the large diameter end of said conical bore being of a greater diameter than the diameter of said pin, said large diameter end of said conical bore facing said one end of said second gib element and the axis of said conical bore being parallel to and offset in said first direction from the axis of said bore in said second gib element.

4. A gib assembly comprising first and second elongate gib elements each having a vertical longitudinal outer side wall, horizontal top and bottom walls, one of said top and bottom walls of each element being narrower than the other, a flat longitudinal inner side wall inclined at a first angle to the vertical, and vertical end walls normal to said outer side wall, said first and second gib elements being of equal length and said first gib element having a height greater than the height of said second gib element, the inner side walls of said first and second gib elements being disposed in flat face-to-face engagement with each other with the outer side walls of said gib elements in parallel relationship to each other and the top wall of said first gib element being narrower than its bottom wall, a pair of end caps respectively fixedly mounted on each end wall of said first gib element and projecting transversely across the respective adjacent end walls of said second gib element, and spring loaded cam means engaged between each end of said second gib element and the adjacent end cap resiliently biasing said second gib element downwardly relative to said first gib element.

5. The invention defined in claim 4 wherein said cam means comprises means defining a downwardly inclined surface on said end cap, pin means slidably received in said second gib element and projecting longitudinally from the end thereof into engagement with said downwardly inclined surface, and spring means longitudinally biasing said pin against said surface.

6. In a device for a machine tool slide assembly or the like comprising a base having an elongate fixed guide rail member with a flat parallel longitudinal side wall, a slide member having an adjacent flat parallel longitudinal side wall spaced parallel from the said side wall of said rail member, and an elongate gib engaged between said pair of adjacent side walls of said slide member and rail member, said gib comprising a first elongate gib element fixedly mounted on the side wall of one of said members and a second elongate gib element slidably engaged between first gib element and the adjacent side wall of the other of said members, said gib elements engaging each other in face-to-face engagement along complementary flat longitudinal side surfaces inclined relative to said side walls whereby relative sliding movement of said gib elements transversely of said inclined side surfaces in one direction exerts a wedging action; the improvement wherein said second gib element is free to move in said first direction relative to said first gib element as permitted by wear between said guide rail member side wall and slide side wall, and means biases said second gib element to move in said first direction.

* * * * *